United States Patent [19]

Truty et al.

[11] Patent Number: 5,430,268

[45] Date of Patent: Jul. 4, 1995

[54] METHOD AND APPARATUS FOR ADJUSTING AND REPLACING EDM COMPONENTS FROM THE GUIDE ASSEMBLY WORKING END

[75] Inventors: Thomas J. Truty, South Barrington, Ill.; Jule L. French, Yoder; Kevin M. Newell, Marion, both of Ind.

[73] Assignee: Basix Technologies Ltd., Fort Wayne, Ind.

[21] Appl. No.: 121,353

[22] Filed: Sep. 13, 1993

Related U.S. Application Data

[63] Continuation-in-part of Ser. No. 78,007, Jun. 16, 1993, Pat. No. 5,380,973, which is a continuation-in-part of Ser. No. 995,887, Dec. 23, 1992, Pat. No. 5,319,175.

[51] Int. Cl.⁶ .............................................. B23H 7/10
[52] U.S. Cl. .................................................. 219/69.12
[58] Field of Search ............ 219/69.12, 137.61, 69.13; 204/224 M

[56] References Cited

U.S. PATENT DOCUMENTS

| | | |
|---|---|---|
| 2,066,588 | 1/1937 | Taylor ................. 219/69.12 |
| 2,302,781 | 11/1942 | La Force . |
| 2,974,216 | 3/1961 | Inoue ................. 219/69.12 |
| 3,463,902 | 8/1969 | Bircher . |
| 3,469,070 | 9/1969 | Bernard et al. . |
| 3,502,841 | 3/1970 | Heer . |
| 3,514,570 | 5/1970 | Bernard et al. . |
| 3,515,845 | 6/1970 | Wildenthaler ................. 219/137.61 |
| 3,531,617 | 9/1970 | Ingram et al. . |
| 3,539,756 | 11/1970 | Schwartzbart et al. . |
| 3,562,842 | 2/1971 | Turnipseed . |
| 3,590,213 | 6/1971 | Caldwell . |
| 3,596,049 | 7/1971 | Ogden . |
| 3,617,688 | 11/1971 | Fogelstrom . |
| 3,632,952 | 1/1972 | Rotolico et al. . |
| 3,639,720 | 2/1972 | Malivoir . |
| 3,652,822 | 3/1972 | Nakamura . |
| 3,689,732 | 9/1972 | Hill . |
| 3,730,136 | 5/1973 | Okada . |
| 3,731,048 | 5/1973 | Ogden, Sr. et al. . |
| 3,746,833 | 7/1973 | Ujiie . |
| 3,783,233 | 1/1974 | dal Molin ................. 219/130 |
| 3,789,186 | 1/1974 | Rygiol . |
| 3,825,719 | 7/1974 | Jonsson . |
| 3,826,888 | 7/1974 | Garfield et al. ................. 219/130 |
| 3,836,747 | 9/1974 | Wlos ................. 219/130 |
| 3,909,585 | 9/1975 | Sanders et al. ................. 219/130 |
| 3,936,654 | 2/1976 | Cannata . |
| 3,943,322 | 3/1976 | Lehmann et al. ................. 219/69.12 |
| 4,017,710 | 4/1977 | Watt ................. 219/130 |
| 4,122,328 | 10/1978 | Essers et al. ................. 219/137.61 |
| 4,128,754 | 12/1978 | Rathjen, Jr. . |
| 4,193,852 | 3/1980 | Inoue . |
| 4,282,419 | 8/1981 | Auer . |
| 4,295,746 | 10/1981 | Hartmann ................. 219/137.61 |
| 4,367,390 | 1/1983 | Balleys et al. ................. 219/69.12 |
| 4,386,259 | 5/1983 | Nagai et al. ................. 219/137.61 |
| 4,422,918 | 12/1983 | Inoue ................. 219/69.12 |
| 4,453,070 | 6/1984 | Bonga ................. 219/69.12 |
| 4,469,927 | 9/1984 | Obara et al. ................. 219/69.12 |

(List continued on next page.)

FOREIGN PATENT DOCUMENTS

| | | |
|---|---|---|
| 56-76337 | 6/1981 | Japan . |
| 56-82133 | 7/1981 | Japan . |
| 60-238233 | 11/1985 | Japan . |

*Primary Examiner*—Geoffrey S. Evans
*Attorney, Agent, or Firm*—George Pappas

[57] ABSTRACT

An electrical discharge machine apparatus including a guide assembly for guiding a wire in cutting engagement with a workpiece and having a working end closest to the workpiece. The apparatus incorporates a bore-type or a barrel-type current pickup in sliding engagement with the wire for transferring current to or from the wire. A ring gear is provided on a flush cup coupled to gear teeth on the current pickup in a manner whereby turning of the flush cup causes turning of the pickup for exposing a new surface to the wire. A process is provided for indexing current pickups from the working end of the guide assembly. A process is also provided for removing and replacing guide assembly components from the working end of the guide assembly.

15 Claims, 9 Drawing Sheets

U.S. PATENT DOCUMENTS

| | | | |
|---|---|---|---|
| 4,482,797 | 11/1984 | Shiramizu et al. | 219/137.61 |
| 4,493,971 | 1/1985 | Nawa et al. | 219/137.61 |
| 4,539,459 | 9/1985 | Yamagata | 219/69.12 |
| 4,559,433 | 12/1985 | Aramaki et al. | 219/69.12 |
| 4,563,569 | 1/1986 | Shiramizu et al. | |
| 4,564,431 | 1/1986 | Miyano | 204/224 M |
| 4,575,612 | 3/1986 | Prunier | 219/137.61 |
| 4,590,358 | 5/1986 | Stol | 219/137.61 |
| 4,605,834 | 8/1986 | Inoue | 219/69.12 |
| 4,638,140 | 1/1987 | Obara et al. | 219/69.12 |
| 4,652,717 | 3/1987 | Briffod et al. | 219/69.12 |
| 4,733,038 | 3/1988 | Girardin | 219/69.12 |
| 4,733,052 | 3/1988 | Nilsson et al. | |
| 4,736,085 | 4/1988 | Inoue et al. | 219/69.12 |
| 4,803,328 | 2/1989 | Obara | 219/69.12 |
| 4,896,013 | 1/1990 | Fricke et al. | 219/69.12 |
| 4,945,208 | 7/1990 | Lian | |
| 4,947,024 | 8/1990 | Anderson | 219/137.61 |
| 4,956,541 | 9/1990 | Hiltunen | |
| 4,978,831 | 12/1990 | Lian | |
| 4,988,846 | 1/1991 | Karlsten et al. | |
| 4,994,643 | 2/1991 | Truty et al. | 219/69.12 |
| 5,003,148 | 3/1991 | Truty et al. | 219/69.12 |
| 5,081,334 | 1/1992 | Copher et al. | |
| 5,089,680 | 2/1992 | Truty | 219/69.12 |
| 5,101,093 | 3/1992 | Matsui et al. | |
| 5,126,524 | 6/1992 | Moro et al. | 219/69.12 |
| 60-249531 | 12/1985 | Japan | |
| 61-76216 | 4/1986 | Japan | |
| 61-117015 | 6/1986 | Japan | |
| 61-168427 | 7/1986 | Japan | 219/69.12 |
| 63-102834 | 5/1988 | Japan | |
| 63-278724 | 11/1988 | Japan | |
| 4-93117 | 3/1992 | Japan | 219/69.12 |
| 4-135121 | 5/1992 | Japan | 219/69.12 |
| 488677 | 10/1975 | U.S.S.R. | |

METHOD AND APPARATUS FOR ADJUSTING AND REPLACING EDM COMPONENTS FROM THE GUIDE ASSEMBLY WORKING END

This application is a continuation-in-part of application Ser. No. 08/078,007 filed on Jun. 16, 1993, now U.S. Pat. No. 5,380,973, and entitled "Current Pickup Indexing Apparatus" which is itself a continuation-in-part of application Ser. No. 995,887 filed on Dec. 23, 1992, now U.S. Pat. No. 5,319,175, and entitled "Apparatus For Transferring Electrical Current To And From A Moving Wire".

TECHNICAL FIELD

The present invention relates to an improvement to an apparatus for conveying electrical current between an electric current member and an electrically conductive wire or cable which moves relative to the current transfer member. More specifically, the present invention relates to a method and apparatus whereby the electric current transfer member can be adjusted for exposing a plurality of contact surfaces to the wire and wherein the adjusting is accomplished from the working end of guide assembly. The present invention also relates to a method of replacing guide assembly components by gaining access to the components through the assembly working end. The present invention has a wide range of potential applications including electrical discharge machines and welders.

BACKGROUND OF THE INVENTION

The placing of electrical current on a moving wire is currently required and is being done in at least the electrical discharge machine (EDM) industries and welding industries. This is currently normally accomplished by providing various shaped current pickups which are electrically charged. The moving wire slides or rubs against the electrically charged surface of the current pickup thus transferring electrical current therethrough to and from the moving wire. One common pickup is generally cylindrically shaped with a bore therethrough. The wire is received through the pickup bore and, because the current pickup bore is offset from the straight line of wire travel, the moving wire electrode rubs against the interior surface of the bore making the necessary electrical contact for transferring current to the moving wire. Other current pickup devices are made with various shaped contact surfaces and are pushed toward the taut moving wire electrode or placed in the normal straight line of wire travel causing the wire to rub against the current pickup contact surface thereby making the necessary electrical contact. Current pickups such as those described hereinabove are, for example, disclosed in U.S. Pat. Nos. 4,896,013 and 4,539,459.

However, the current pickups which are presently known and used have substantial shortcomings and drawbacks. Like all current pickups, as the moving wire slides against the pickup contact surface, the current pickup tends to wear and the wire causes a groove to be formed in the pickup through the original contact surface. Once the groove becomes sufficiently large in depth, the wire tends to bind therein causing wire breakage and requiring the stopping of, for example, the EDM operation and re-threading of the wire. As the groove is formed, the wire also tends to get closer to the normal straight line of wire travel (straighter) and even though the wire remains taut, there is insufficient contact between the wire and the new contact surface at the bottom of the groove for efficient current transfer. In view of this, after a particular contact surface has worn by a predetermined amount, the current pickup position is changed so as to provide a new contact surface or the entire current pickup itself is replaced.

Prior current pickups, however, provide relatively few contact surface positions whereat a new contact surface can be exposed to the moving wire. Typically, the cylinder-shaped pickups have a bore diameter only slightly larger than the wire diameter and, therefore, the maximum number of contact surfaces is four. Each of the contact surfaces for these current pickups are located on the current pickup bore surface at 90 degrees from each other with respect to the bore longitudinal axis. After these four contact surfaces have been exposed and worn, the current pickup is no longer useful and is replaced. Exposing the four different contact surfaces of the cylinder-type pickups, however, normally requires the disassembly of the various guide arm assembly components so as to gain access to the current pickup located therein and so that a tool or other means can be used for turning the current pickup about its longitudinal axis and exposing the new contact surface. An example of this is disclosed in U.S. Pat. No. 5,089,680. As can be appreciated, although this is generally acceptable, the disassembly of the entire guide arm to gain access to the current pickup can be cumbersome, time-consuming and, thus, costly. In addition, although other devices such as those disclosed in U.S. Pat. No. 4,994,643 have been devised for tilting and/or turning the cylindrical-type current pickup without disassembly of the entire guide arm, such devices of the past are somewhat complex and costly. Furthermore, even with such devices, the replacement of the current pickup, once all bore contact surfaces have been diminished still requires complete disassembly of the guide arm for gaining access to the current pickup and replacing the same. Again, this is somewhat cumbersome, time-consuming and costly.

Accordingly, a need exists for a current pickup apparatus that conveys electrical current to and from a moving wire and which overcomes the above-discussed disadvantages associated with prior current pickup assemblies and which further provides a substantial number of different contact surfaces on the pickup and which allows easy removing and replacing the pickup without disassembly of the guide arm assembly housing the pickup. In addition, a need exists for such apparatus which is both reliable and generally inexpensive to manufacture, assemble and operate.

SUMMARY OF THE INVENTION

It is the principal object of the present invention to overcome the above-discussed disadvantages associated with prior current pickups.

The present invention provides a rod-shaped or cylindrical pickup at an acute angle with respect to the axis of the wire defined by two points. This axis or normal straight line of travel of the wire is offset so as to intersect the outer surface of the rod and cause the wire to rub thereagainst in a helical or elliptic contact pattern. Accordingly, although the rod diameter is circular and generally small, the contact surface appears elliptical to the wire along its contact length.

More specifically, the electrically conductive rod has a circular outer surface with respect to its longitudinal axis and is received within a bore of a rod support or holder body. The rod holder body includes a wire-receiving hole therethrough at an acute angle from the rod and bore longitudinal axes. The wire-receiving hole surface and the bore surface intersect and thereby define a generally straight elongate passage therebetween. The electrically-conductive wire to which electrical current is transferred is received through the wire hole and is guided therethrough with two guide members which are preferably the orifice-type, one on each side of the wire hole. The passage between the wire hole and the bore is generally parallel to a straight line defined between the guide member bores. This straight line also intersects the electrically-conductive rod circular outer surface so that when wire traveling through the two guide bores is made taut, the wire contacts the rod circular outer contact surface along a curvilinear path or, more specifically, along a path defined by a segment of an ellipse.

So as to provide a plurality of contact surfaces, according to the present invention, as one curvilinear path contact surface of the conductive member or rod is worn, another similar curvilinear contact surface is provided by turning the rod about its longitudinal axis to expose a new unworn portion of the rod outer surface. The total theoretical available different contact surfaces is equal to the circumference of the rod diameter divided by the diameter of the wire being used. For example, a 0.375 inch diameter rod used in conjunction with a 0.002 diameter wire can provided a total of 589 different contact surfaces. However, to prevent the wire from falling back into a previously created groove and, further, because the wire tends to vibrate and cause a groove somewhat larger than its own diameter, the actual number of contact surfaces is less than theoretical.

Various different assemblies are provided for turning the conductive member rod about its longitudinal axis. One assembly includes a tool receiving opening on one longitudinal end of the rod and adapted for cooperating with a tool which is rotated and which causes the conductive member to turn about its longitudinal axis.

Another assembly for turning the conductive member rod about its axis includes gear teeth around the circumferential surface of the conductive member at one longitudinal end. A driving gear is provided meshing with the conductive member rod gear teeth and is selectively turned for causing the conductive member to turn about its longitudinal axis. In a preferred assembly, the ring gear is on an annular member having a longitudinal axis and surrounding the conductive member rod. The annular member is adapted for rotational movement, thus causing the conductive member to be turned about its axis. An index pin mechanism is provided on the annular member for selectively stopping the annular member at each of the plurality of positions and thus providing a plurality of contact surfaces corresponding to each stopping position. The annular member is provided with indications such as numerals corresponding to a stopping position and a contact surface, so that the operator can know which contact surface is currently being used and the number of contact surfaces remaining unworn.

In another embodiment, the ring gear is on a flush cup which is detachably attached to the guide arm assembly. The flush cup is adapted for rotational movement and, thus, causing the turning of the conductive member.

In another embodiment, the driving gear is a bevel gear located on the end of a shaft which is itself adapted for rotational movement about the shaft longitudinal axis. In a similar embodiment, a driving bevel gear is provided and adapted for rotation about an axis which is at an acute angle from the conductive member longitudinal axis. A second bevel gear is adapted for meshing with the first driving bevel gear and, thus, the turning of the second bevel gear causes selective turning of the conductive member rod.

In another embodiment, the driving gear is a worm gear on the end of a shaft which is itself adapted for rotation about the shaft axis thereby causing the conductive member rod to selectively turn about its longitudinal axis.

In all of the foregoing embodiments, there are provided devices for both indexing to discrete positions corresponding to contact surfaces on the conductive member and, also, indicating devices for telling the operator which of the plurality of contact surfaces is currently being used.

In yet another embodiment, there is provided a toggle mechanism for selectively contacting the member gear teeth and partially turning the conductive member about its longitudinal axis and, thereafter, retracting in a position for selectively repeating the contacting and partial turning. When in the retracted position, the toggle mechanism cooperates with the member gear teeth for preventing rotational movement of the conductive member. As with the preferred embodiment here, each toggle provides a new contact surface on the conductive member and indications are provided for indicating to the operator which of the plurality of contact surfaces is presently being used.

The conductive member rod is retained in a bore of a holding or supporting body. The conductive member is loaded into its holding bore by detaching the flush cup and removing and replacing the conductive member from the working end of the support arm assembly and holding body. In one embodiment, the removal of the flush cup exposes the conductive member bore in the supporting body and by removing a retaining clip, the conductive member can be removed and replaced. In another embodiment, the support body is detached from the support arm thus exposing one end of the conductive member holding bore and allowing the replacement of the conductive member.

In yet another embodiment, a traditional bore-type current pickup or an outside contact surface type pickup such as a barrel-shaped pickup is used but, in accordance with the present invention, is adjusted or otherwise rotated from the working end of the guide assembly. Preferably, the adjusting or rotating of the traditional pickups is accomplished by a ring gear located on either the flush cup or a ring member circumscribing the wire and coupled to gear teeth formed or otherwise affixed to the pickup. Alternatively, a tool mechanism can be extended from the working end either through the flush cup or cover member or by removing the flush cup or cover member and thereby engaging and turning or otherwise adjusting the current pickup. In any event, the pickup is adjusted from the working end or side of the guide assembly.

As also discussed hereinabove, the present invention further provides for replacement and/or removal of various guide assembly components, such as the current pickup or guide elements by providing access to the guide assembly components through the working end.

In this regard, the flush cup or any other cover member that may be on the working end is removed or otherwise pushed or set aside so as to obtain access to the various guide assembly components from the working end. Thus, the guide assembly components are easily removed and replaced without having to disassemble the entire guide assembly.

In one form thereof, the present invention is directed to an electrical discharge machine apparatus including a wire guide assembly for guiding a moving conductive wire in cutting engagement through a workpiece and having a working end closest to the workpiece. The apparatus includes an electrically conductive member in sliding engagement with the wire and a mechanism for adjusting the conductive member to expose a plurality of contact surfaces to the wire. The adjusting mechanism is accessible from the working end of the guide assembly.

In one form thereof, the present invention is directed to a process of exposing a plurality of pickup contact surfaces to the wire of an electrical discharge machine including a wire guide assembly for guiding a moving conductive wire in cutting engagement through a workpiece. The guide assembly includes a current pickup in sliding engagement with the wire and being adjustable for exposing a plurality of contact surfaces to the wire. The assembly further includes a working end closest to the workpiece. The process includes the step of causing motion of the pickup through the assembly working end and thereby adjusting the pickup for exposing another contact surface to the wire.

In one form thereof, the present invention is directed to a process of replacing guide assembly components in an electrical discharge machine including a wire guide assembly for guiding a moving conductive wire in cutting engagement through a workpiece. The assembly has guide assembly components including a guide element for guiding the wire and a current pickup for placing current on the wire. The assembly further includes a working end closest to the workpiece. The process includes the steps of gaining access to the guide assembly components through the assembly working end and replacing a guide assembly component.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein.

Corresponding reference characters indicate corresponding parts throughout the several views of the drawings.

The exemplifications set out herein illustrated preferred embodiments of the invention in one form thereof and such exemplifications are not to be construed as limiting the scope of the disclosure or the scope of the invention in any manner.

DETAILED DESCRIPTION OF SPECIFIC EMBODIMENTS

Figure 1:
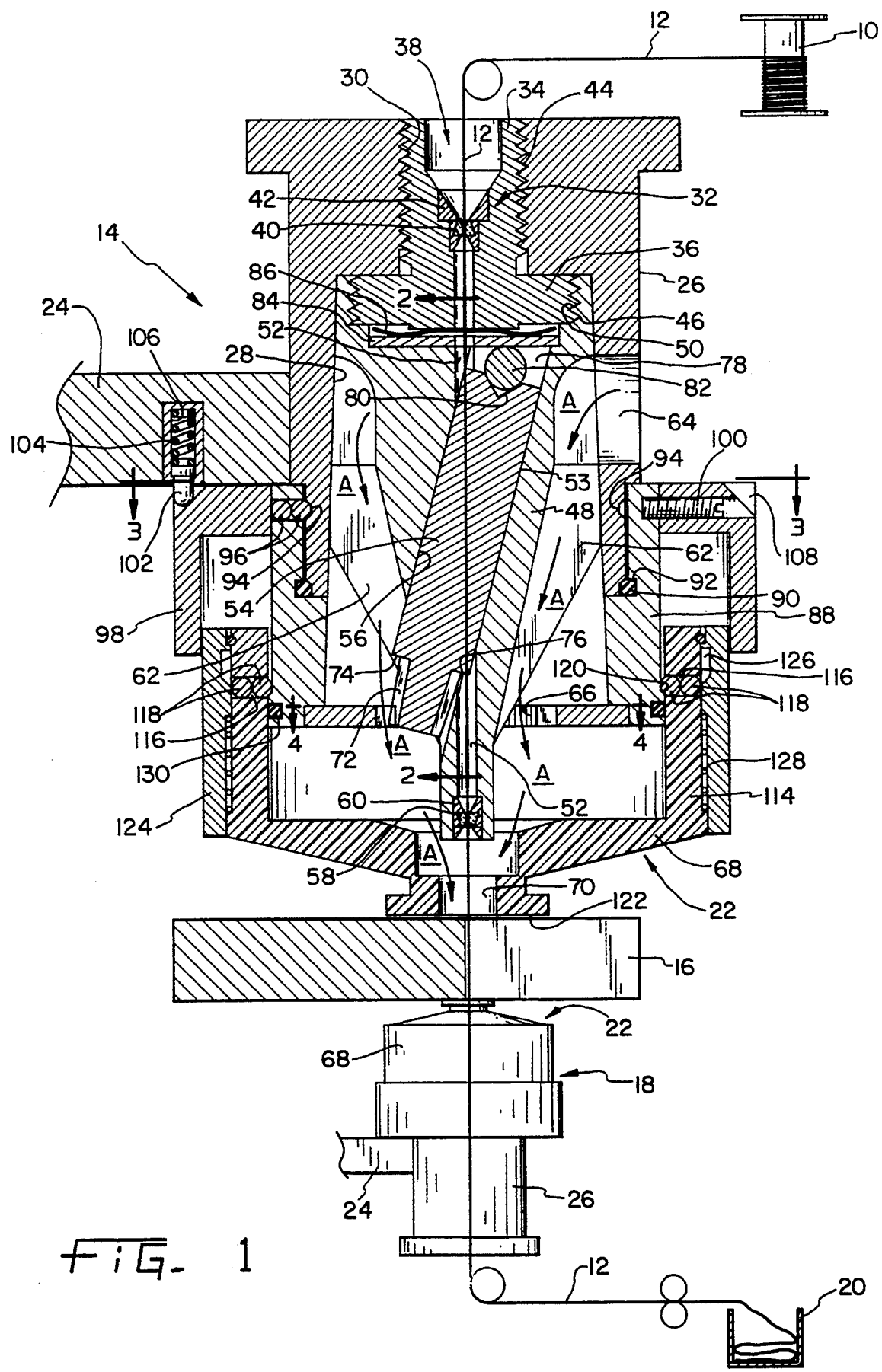
FIG. 1 is a cross-sectional view of an electrical discharge machine support arm assembly and guides for guiding the wire and incorporating an improved apparatus according to the present invention.
Figure 2:
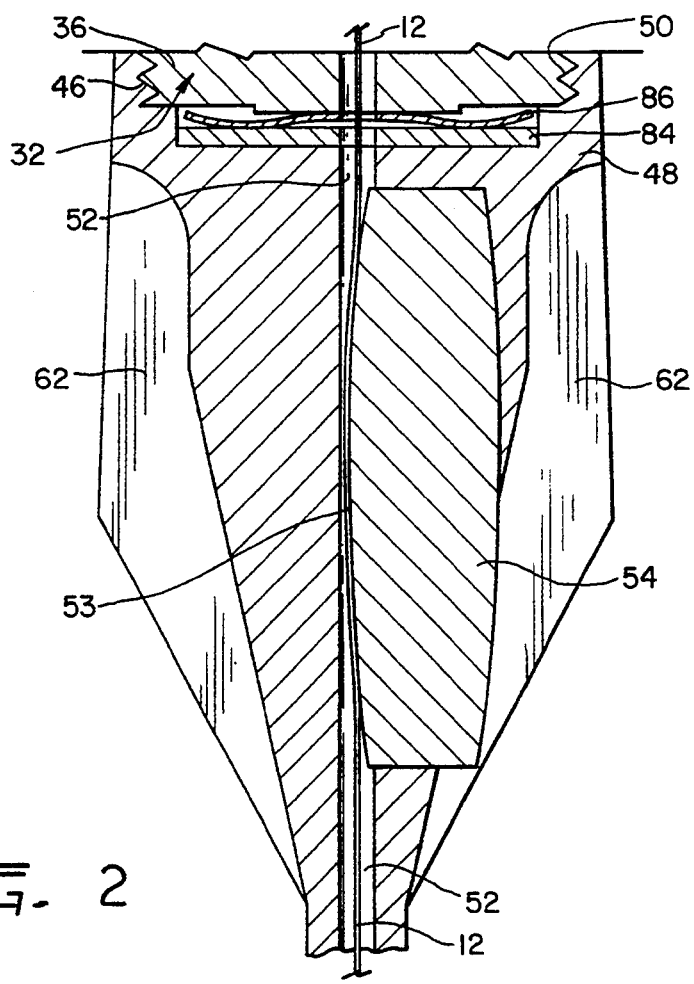
FIG. 2 is a cross-sectional view of the apparatus shown in FIG. 1 taken along line 2—2.

Referring initially to FIG. 1, the general operation of an electrical discharge machine is diagrammatically shown. The discharge machine includes a supply spool of wire 10 providing wire 12 through an upper support assembly and guiding arm 14, a workpiece 16, a lower support assembly and guiding arm 18 and, finally, unloading the wire 12 into container 20. Each of the support guiding assemblies 14 and 18 have a working end designated by the numeral 22 for facing in the direction of workpiece 16 when workpiece 16 is being cut.

Assemblies 14 and 18 each include a support arm 24 selectively movable in a known and customary manner for moving the support and guiding assemblies 14 and 20 during the cutting operations. The support and guiding assemblies include a barrel 26 having an inner tapered surface 28 and an upper left-handed threaded bore 30. A T-member 32 having an elongate portion 34 and a disk portion 36 is provided at the upper end of barrel 26. T-member 32 includes a bore 38 wherethrough wire 12 is received. An orifice-type guide member 40 made of diamond or other suitable material is provided and is mounted via sintered metal 42 or by other suitable means within bore 38. The elongate portion 34 of T-member 32 has left-handed threads 44 adapted for threadingly engaging and being received within left-handed threaded bore 30 and securing T-member 32 as shown. The circumferential side of disc portion 36 of T-member 32 is threaded with right-handed threads 46.

A support or holder body 48 is provided for partially being received within tapered bore 28 and includes a threaded bore 50 adapted for engaging right-handed threads 46 of disc portion 36. Thus, support body 48 can be drawn up into tapered bore 28 and tightly secured in position as shown. Support body 48 includes a wire hole 52 wherethrough wire 12 is caused to travel and come in contact with a contact surface 53 over conductive member or rod 54 received within conductive member bore 56. As shown in FIG. 1, conductive member bore 56 and, thus, conductive member 54 have colinear longitudinal axes which are at an acute angle with respect to the normal straight line of wire travel as diagrammatically depicted by wire 12 in FIG. 1. At the end of wire hole 52 closest to workpiece 16, there is provided a guiding member 58 being of the orifice type and being made of diamond or other suitable material. The guiding member 58 is mounted within wire hole 52 with a sintered metal nib 60 or other suitable material in a known and customary manner. Thus, the normal straight line of wire travel is better defined by a line directly between the orifice openings of guide members 40 and 58.

It is noted that the outer surface of support body 48 is adapted for contacting engagement of tapered bore 28. In addition, a plurality of grooves 62 are provided circumferentially around support body 48 and communicating with fluid intake opening 64. A dielectric fluid is, thus, provided under pressure through intake opening 64 as indicated by arrows A through grooves 62 and ring gear 66 into flush cup 68 and out through the flush cup central opening 70 toward workpiece 16.

As shown in FIG. 1, conductive member 54, at its lower end thereof towards the workpiece, includes a plurality of gear teeth 72. Gear teeth 72 are provided circumferentially around the outer surface at the longitudinal lower end of conductive member 54 and, further, are provided at a slight tapered angle with respect to the conductive member longitudinal axis. Teeth 72 terminate at an annular flat 74 which is adapted to engage an annular edge 76 formed at the lower end toward workpiece 16 of bore 56. Thus, conductive member 54 can only be loaded within support body 48 through the upper end 78 of bore 56. At the lower end of member 54, gear teeth 72 are exposed outside of support body 48 and mesh with the teeth of ring gear 66. At the upper end 78 of bore 56, conductive member 54 is provided with a conical indentation 80 supporting a ball bearing 82. An annular disc 84 is provided thereover along with a ring spring 86. Both annular disc 84 and ring spring 86 are received within threaded bore 46 and are sandwiched between T-member 32 and support body 48 in a manner whereby a constant biasing force is provided onto ball bearing 82. This force is transferred downwardly keeping conductive member 54 in position and with annular flat 74 against edge 76. As can be appreciated, the biasing force and the various frictional forces by the assembly are taken into consideration for manufacturing and assembly so as to allow the turning of conductive member 54 about its longitudinal axis with relative ease.

It is now noted that the conductive member 54 can be replaced from the working end 22 by removing the flush cup 68 as more fully discussed hereinbelow, unscrewing support member 48 from T-member 32, removing the support member 48 from within tapered bore 28 and then pulling the conductive member 54 out of bore 56 and replacing with a new conductive member and then again reinserting and attaching the support member 48 in the position as shown. As can be appreciated, this eliminates the need for disassembly of the entire support assemblies 14, 18 for replacing the guide member as was required by the prior art.

So as to maximize performance and provide a maximum number of conductive contact surfaces for wire 12, conductive member 54 is selectively turned about its longitudinal axis for exposing new contact surfaces along the exterior surface 53 of conductive member 54. More specifically, ring gear 66, in the embodiment shown in FIG. 1, acts as the driving gear meshing with gear teeth 72 in a manner whereby the rotational movement of ring gear 66 causes the turning of conductive member 54. In this regard, ring gear 66 is attached to annular ring member 88 which is rotatably affixed to the lower end of barrel 26. O-ring 90 is provided in the annular groove 92 and between annular ring 88 and barrel 26 to provide a hermetic seal thereat. An annular race 94 is provided on the outer surface of barrel 26 for partially receiving ball bearings 96. Thus, annular ring 88 is fixed with respect to the longitudinal but can be selectively rotated thereabout around barrel 26.

Ball bearings 96 are retained in place via L-shaped ring 98 which circumscribes and is affixed to annular ring 88 via set screws 100. Accordingly, to remove annular ring member 88, set screws 100 are loosened thereby removing L-shaped ring 98 and releasing ball bearings 96 out of annular race 94 and allowing annular ring member 88 to be pulled away from barrel 26. However, when L-shaped ring 98 is in place as shown in FIG. 1, the operator need only grasp the L-shaped ring 98 and turn the same about the longitudinal axis causing ring gear 66 to turn conductive member 54 and, thereby, place the conductive member 54 in another one of the plurality of positions and selectively exposing another unworn contact surface.

In view of the large number of contact surfaces along the outer surface of conductive member 54, there is provided an index mechanism whereby conductive member 54 can be selectively stopped at a plurality of discreet positions and, thus, providing the plurality of different contact surfaces. The index mechanism shown in FIG. 1 includes a detent pin 102 being biased toward L-shaped ring member 98 via spring 104 received within bore 106. Detent pin 102 is selectively received within the detents 108 along the outer circumferential surface of L-shaped ring 98. The force of spring 104, the shape of detent pin 102 and the shape of the L-shaped ring portions 110 inbetween detents 108 are made such that the operator must place a greater force for the detent pin to travel over portions 110 and into the next detent 108. In addition, the number of detents placed on the L-shaped ring 98 is mathematically calculated and set so that each of the plurality of detents 108 corresponds with a specific curvilinear contact surface on the outer surface of conductive member 54. In this fashion, the operator is also assured that rotation of L-shaped ring 98 into the next succeeding detent or notch will cause a new unworn contact surface to be exposed to wire 12.

Figure 3:
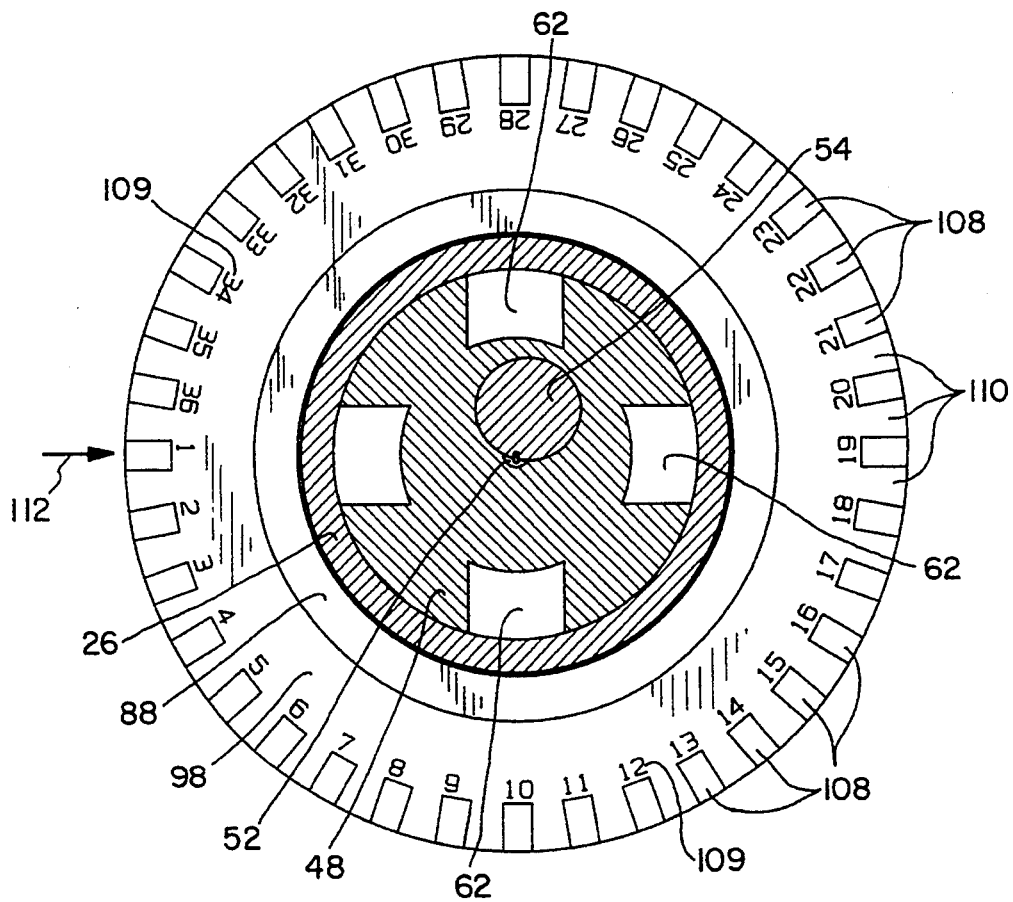
FIG. 3 is a cross-sectional view of the apparatus shown in FIG. 1 taken along line 3—3.
Figure 4:
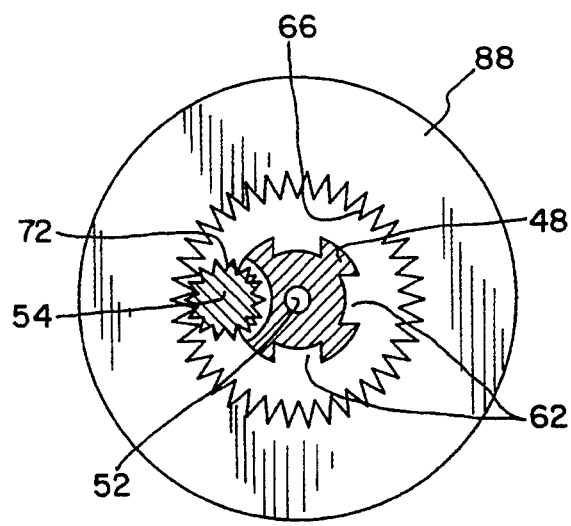
FIG. 4 is a cross-sectional view of the apparatus shown in FIG. 1 taken along line 4—4.

A plurality of indicators, such as numerals 109, are also provided on the L-shaped ring corresponding to each of the plurality of detents 108 for displaying to the operator and providing an indication as to which of the plurality of contact surfaces is currently being used. An arrow 112 diagrammatically shown in FIG. 3, can also be printed on, for example, barrel 26 to provide a reference point to the operator. In this fashion, the operator will also know how many of the plurality of contact surfaces have already been used and will know when to get ready to replace the conductive member 54 due to a completely worn outer surface 53.

It is also noted that it is contemplated for L-shaped ring 98 and/or other driving mechanisms, as will be described hereinbelow, to be used in a continually driving fashion while wire 12 is caused to travel over conductive member 94 and, in a manner whereby the entire outer surface of conductive member 54 is caused to wear evenly and not at discreet locations.

Advantageously, the preferred embodiment of FIG. 1 further includes a detachably attachable flush cup 68. Flush cup 68 includes a cylindrical wall 114 provided with tangential bores 116 whereat there are received ball bearings 118. Ball bearings 118 extend radially inwardly and engage annular edge 120 of annular ring 88 for retaining flush cup 68 mounted thereon. In addition, ball bearings 118 allow flush cup 68 to freely slide longitudinally in a manner whereby the pressure of the fluid therein will push the flush cup 68 toward workpiece 16 and cause the flush cup lowermost surface 122 to be forced against workpiece 16.

For detaching flush cup 68 from assembly 14, a cylindrical member 124 is provided circumscribing cylindrical wall 114 of flush cup 68. Cylindrical member 124 is provided with an annular groove 126. A spring 128 is also provided inbetween wall 114 and member 124 urging member 124 in the position as shown in FIG. 1 for retaining ball bearings 118 in tangential bore 116. For removing the flush cup 68, the operator need only grasp cylindrical member 124 moving the same longitudinally away from assembly 114 and causing annular groove 126 to be aligned with tangential bore 116 and thereby allowing ball bearings 118 to be moved radially outwardly and within annular groove 126. Accordingly, annular edge 120 can now be avoided and flush cup 68 can be detached from annular ring 88. It is noted that replacement of flush cup 68 merely requires the reverse operation for allowing ball bearings to slip over edge 120 and thereafter be forced against the outer surface of annular ring 88 and against edge 120 for retaining flush cup 168 in the shown position. It is also noted that an O-ring 130 is provided inbetween flush cup cylindrical wall 114 and annular ring 88 for providing a hermetic seal thereat and allowing the dielectric fluid to only travel outwardly from flush cup 68 through flush cup central opening 70.

As can be appreciated from the foregoing, the improved apparatus as shown in FIGS. 1-4 not only provides a plurality of different contact surfaces to the wire, but also allows for easily replacing the conductive member 54 from the working end 22.

Figure 5:
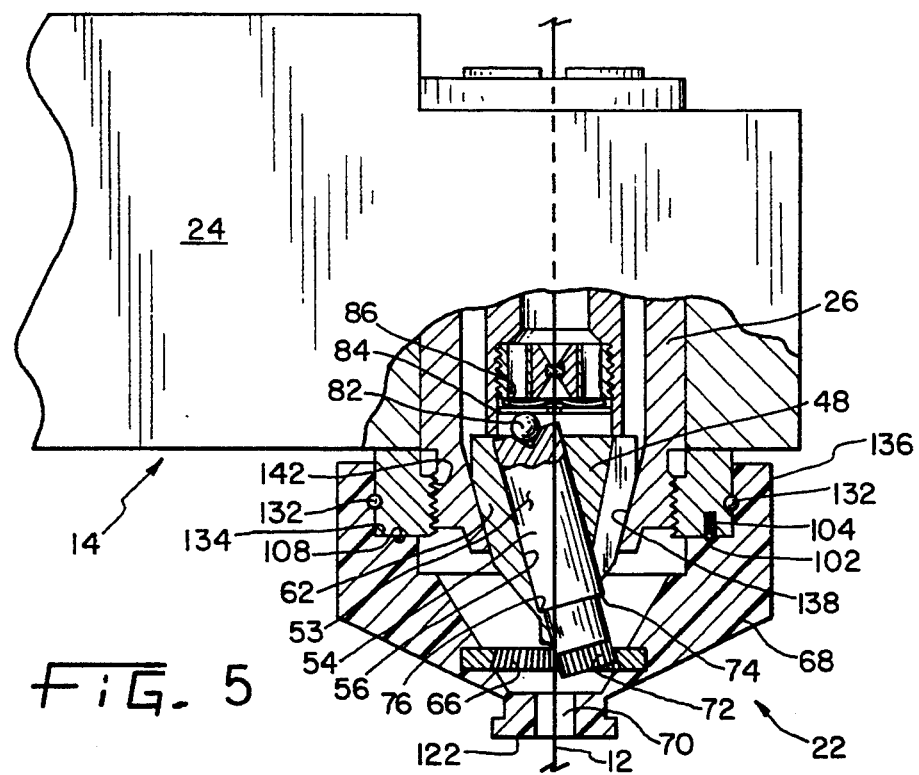
FIG. 5 is a partial cross-sectional view showing another improved apparatus according to the present invention.

In another embodiment, as shown in FIG. 5, the driving gear 66 is also a ring gear, however, is now mounted directly to the flush cup 68. Flush cup 68 is adapted for rotational movement about the longitudinal and, in this regard, is diagrammatically shown as having ball bearings 132. Similar to the flush cup shown in FIG. 1, the flush cup of FIG. 5 can also be detachably attached, however, in a position for preventing longitudinal movement and keeping ring gear 66 and teeth 72 in meshing alignment. An index mechanism in the form of a spring 104 and detent pin 102 is also provided similar to the embodiment of FIG. 1. However, in this embodiment, detent pin 102 cooperates with detents located on the flush cup surface 134. Further yet, indicating numerals or other symbols (not shown) are provided on outer surface 136 of flush cup 68 for indicating the discrete position corresponding to a contact surface being used by the conductive member 54.

It is noted that in the embodiment of FIG. 5, a prior art type of support assembly 14 has been modified for receiving the present improved apparatus and that conductive member 54 must be mounted by disassembling assembly 14 and placement of support body 48 and conductive member 54 from the top or the non-working end. Here, the support body 48 is forced against the tapered bore 138 of barrel 26. It is, however, contemplated that the support assembly 14 of FIG. 5 could be modified in a manner similar to FIG. 1 whereby loading of the conductive member 54 can be accomplished by removing flush cup 68 and loading the conductive member 54 from the working end 22.

Figure 8:
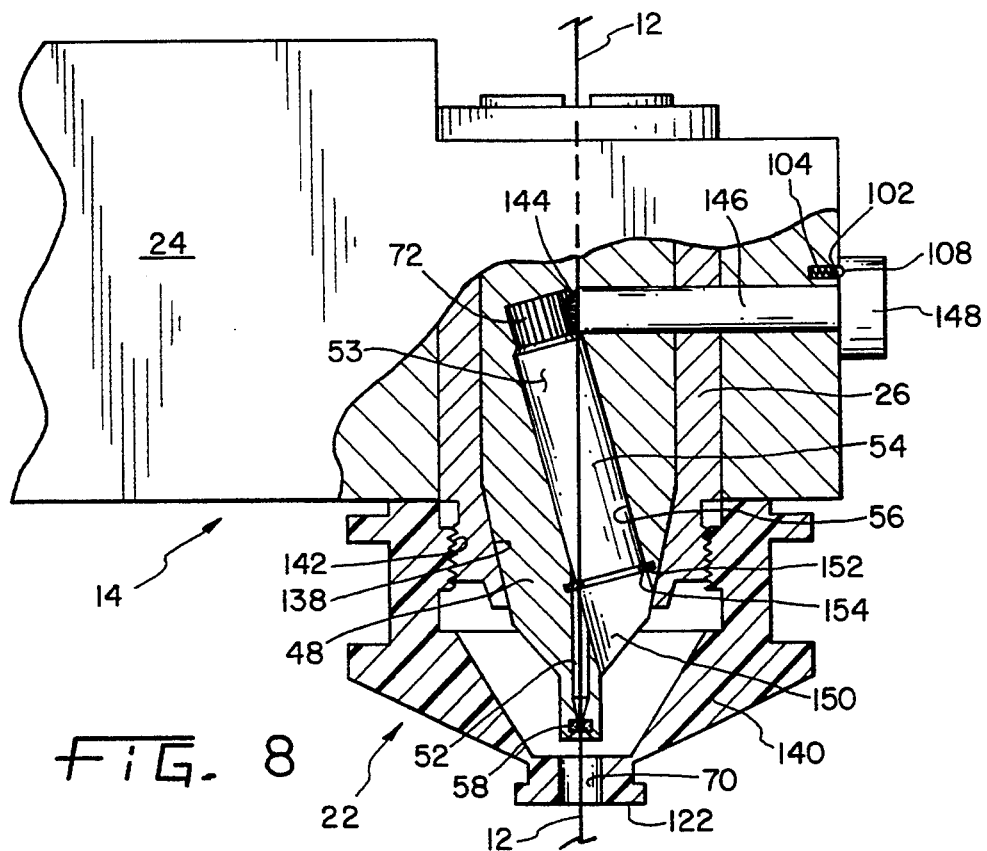
FIG. 8 is a partial cross-sectional view of another improved apparatus according to the present invention.
Figure 9:
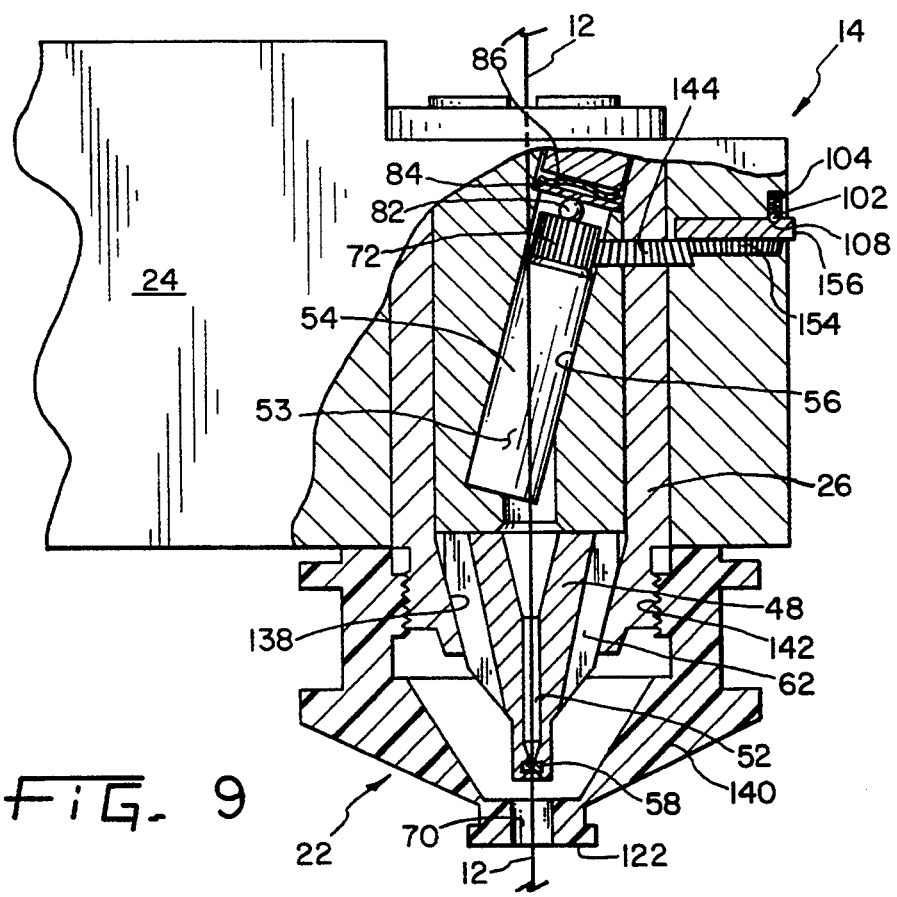
FIG. 9 is a partial cross-sectional view of another improved apparatus according to the present invention.

FIGS. 6-12 diagrammatically show some additional contemplated embodiments according to the present invention. In each of these embodiments, a prior art type of flush cup 140 is shown affixed to the support assembly 14 via threads 142. In the embodiments of FIGS. 8 and 9, the driving gear is a bevel type gear 144 meshing with teeth 72 of conductive member 54. These bevel gears 144 have an axis of rotation which will always be at an acute angle from the conductive member longitudinal axis. In the embodiment shown in FIG. 8, bevel gear 144 is on the end of a shaft 146 which itself has a central longitudinal axis which is colinear with the bevel gear axis of rotation. At the other end of shaft 146, there is provided a knob 148 adapted for grasping and turning. Thus, by turning shaft 146 about its longitudinal axis, conductive member 54 is caused to turn about its axis for exposing the plurality of contact surfaces to wire 12. Similarly, an index mechanism such as a spring and ball detent is provided for stopping at discreet positions corresponding with contact surfaces. Further yet, symbols or other indicators (not shown) can be placed on the knob 148 or some other mechanically equivalent indication mechanism can be incorporated for showing the operator the contact surface currently being used.

In the embodiment of FIG. 8, similar to that of FIG. 1, the conductive member 54 is loaded from the working end 22. Here, a bore 56 for conductive member 54 is provided in supporting body 48. An annular edge 76 is not provided in bore 56 of this embodiment and, thus, conductive member 54 is inserted and removed from bore 56 from bore opening 150. An annular groove 152 is, however, provided on the inside surface of bore 56 and is adapted for receiving snap ring 154 thereat. Snap ring 154 extends into bore 56 and acts to retain conductive member 54 therein. Thus, conductive member 54 is selectively removed from bore 56 by first removing flush cup 140 and snap ring 154 and withdrawing conductive member 54 from bore 56. After a new conductive member is inserted within bore 56, the snap ring 154 is replaced and the new conductive member is ready for operation.

In the embodiment of FIG. 9, conductive member 54 is shown as being loaded from the top or the non-working end 22. It is noted, however, that both bevel gear 144 and second bevel gear 154 can be located closer to the workpiece in a manner whereby conductive member 54 can be loaded from the working end 22 similar to the embodiment of FIG. 8 described hereinabove. In the embodiment of FIG. 9, the second bevel gear 154 meshes with bevel driving gear 144 and a radial surface 156 is provided with second bevel gear 154 in a manner whereby the operator can cause the turning of bevel gear 154. In this fashion, bevel gear 154 which has an axis of rotation being parallel to the axis of rotation of bevel gear 144 causes bevel gear 144 to turn about its axis of rotation and, thus, also causing conductive member 54 to turn about its longitudinal axis and exposing its plurality of contact surfaces to wire 12. Similar to the embodiment of FIG. 8, a spring and ball detent mechanism is provided for selective stopping at discreet positions corresponding to specific contact surfaces and symbols or other indications are provided on radial surface 156 for indicating the specific contact surface being used.

Figures 6, 7:
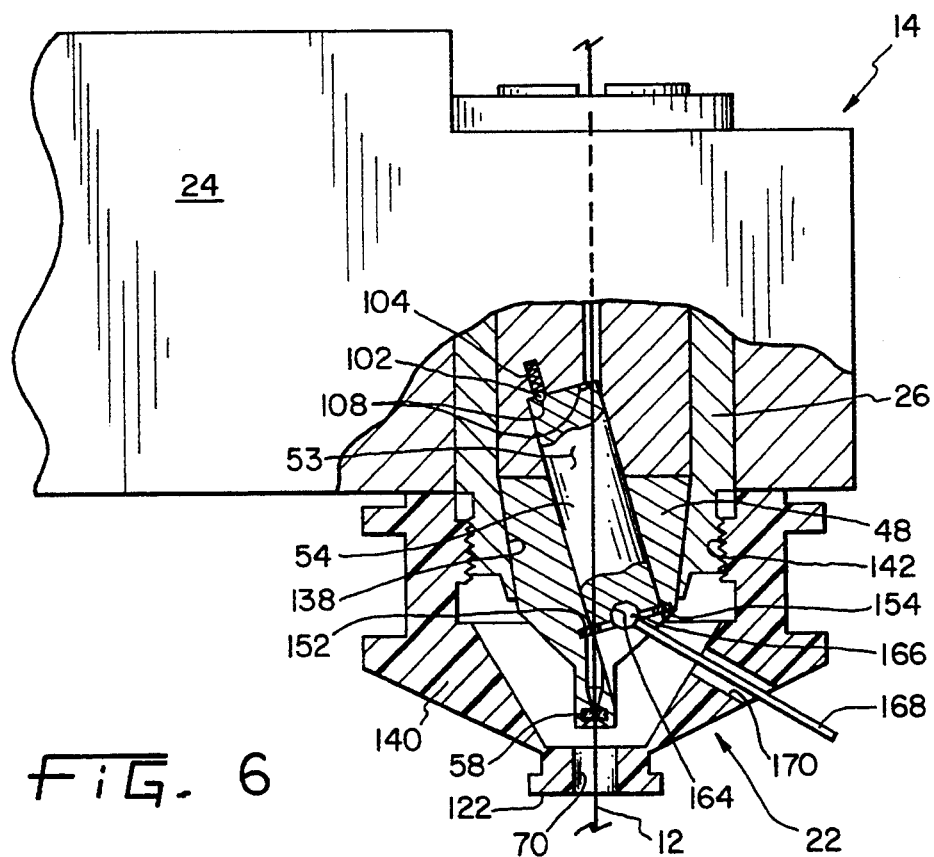
FIG. 6 is a partial cross-sectional view of another improved apparatus according to the present invention.
FIG. 7 is a partial cross-sectional view of another improved apparatus according to the present invention.

Referring now to FIG. 7, a worm gear 158 is provided on the end of shaft 160. The worm gear and shaft 160 are situated generally perpendicular to conductive member 54. Here, worm gear 158 acts as the driving gear. At the other end of shaft 160 there is provided a knob 162 adapted for grasping and turning by the operator. Accordingly, turning of knob 162 causes driving worm gear 158 to turn and mesh with teeth 72 thereby causing conductive member 54 to turn about its longitudinal axis. Similar to the embodiment of FIG. 8, an index mechanism and an indication means is provided with this embodiment. Furthermore, conductive member 54 is loaded from the working end 22 through the use of snap ring 154.

Referring now to FIG. 6, conductive member 54 is again loaded from the working end 22 by removing the flush cup 140 and snap ring 154. In this embodiment however, there is provided a tool receiving means shown in the form of a hexagonally-shaped recess 164. Hexagonally-shaped recess 164 is provided at the longitudinal end of conductive member 54 and is adapted for receiving therein and cooperating with a tool shown in FIG. 6 in the form of a hexagonal ball 166 on the end of a rod 168. Thus, by inserting hexagonal ball 166 in recess 164 and turning rod 168, conductive member 54 is caused to turn about its longitudinal axis. An index mechanism is also provided with this embodiment similar to the index mechanisms shown and discussed hereinabove for stopping conductive member 54 at discreet positions. Here, however, the plurality of detents 108 are provided on the upper end of conductive member 54. Further yet, for speeding up the turning of conductive member 54 to the next indexed contact surface, a selectively openable and closable hole 170 is provided in flush cup 140. Thus, when turning is required, hole 170 is opened allowing the insertion of hexagonal ball 166 and rod 168 and, after conductive member 54 is turned to its next successive position, the tool is retracted therefrom and hole 170 is closed with an appropriate cap (not shown).

Figure 10:
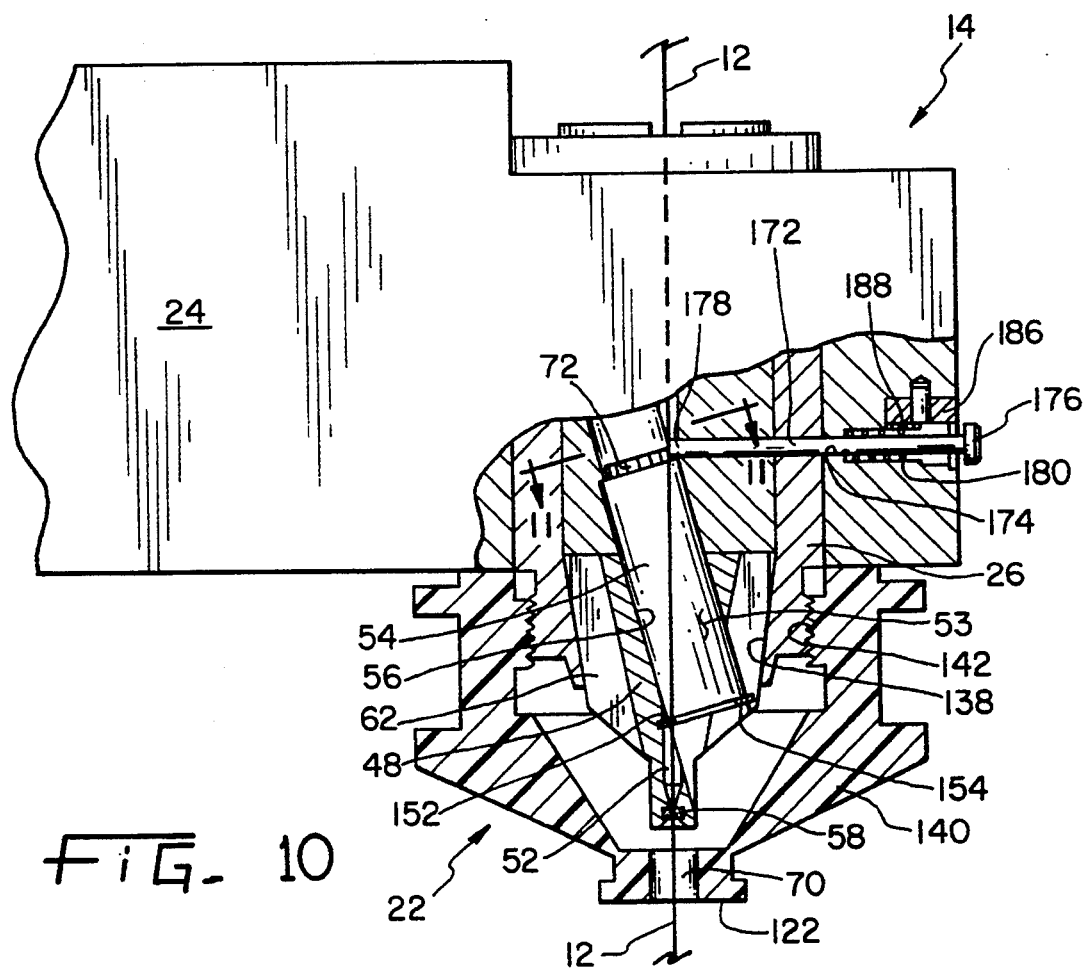
FIG. 10 is a partial cross-sectional view of another improved apparatus according to the present invention.
Figure 11:
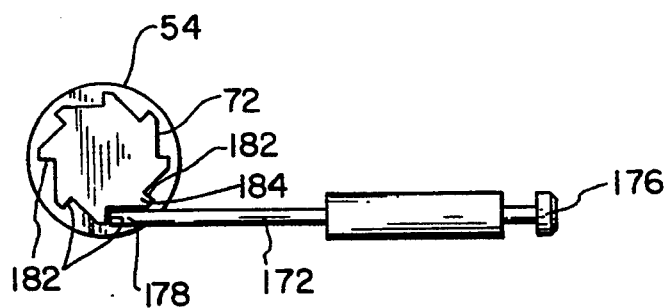
FIG. 11 is a partial view taken along line 11—11 of FIG. 10 and showing part of the toggle mechanism.
Figure 12:
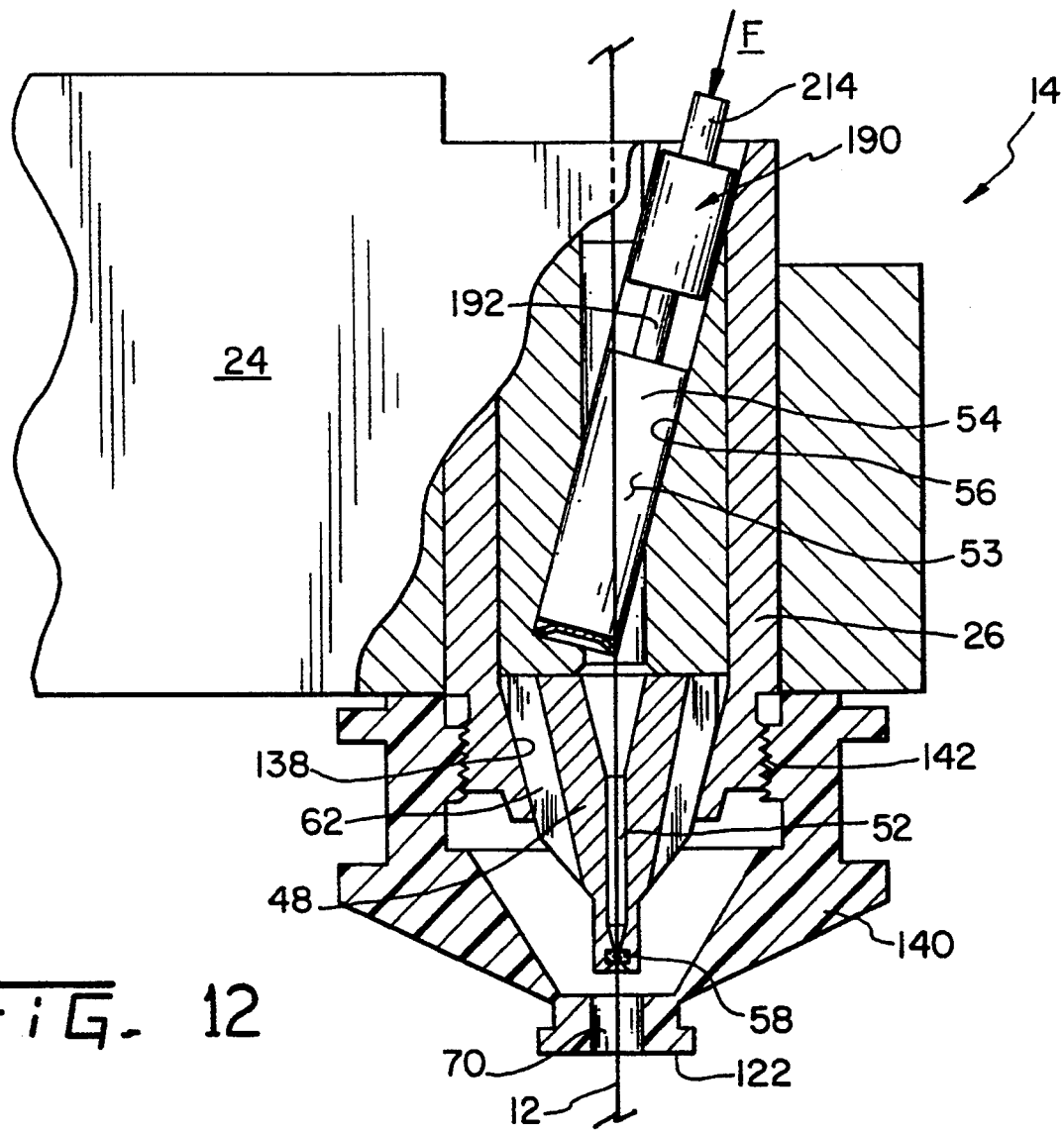
FIG. 12 is a partial cross-sectional view showing yet another improved apparatus according to the present invention; and, FIG. 13 is a blown-up diagrammatic view of a toggle mechanism incorporated in the improved apparatus of FIG. 12.

In the embodiments shown in FIGS. 10–12, there are shown toggle mechanisms adapted for selectively contacting at least one gear tooth 72 at a time and partially turning conductive member 54 about its longitudinal axis and, thereafter, retracting in a position for selectively repeating the contacting and partial turning. In the embodiment of FIG. 10, the toggle mechanism includes a flexible elongate shaft 172 received within a bore 174 and adapted for longitudinal movement therein. A push button 176 is provided at one end of shaft 172 whereas the other end 178 is in contact with gear teeth 72. A spring 180 biases shaft 172 in the position shown in FIGS. 10 and 11.

In operation, push button 176 is depressed causing end 178 of shaft 172 to be forced against one of a surface 182 of gear teeth 72 (shaped differently in this embodiment than previously discussed embodiments) and thus causing conductive member 54 to be turned about its longitudinal axis. It is noted that shaft 172 is flexible and is caused to flex radially away from conductive member 54 by the next successive tooth, 184 in FIG. 11. However, releasing push button 176 allows spring 180 to push shaft 172 away from gear teeth 72 and causing end 178 to be placed in position for next pushing surface 182 of the next succeeding tooth 184.

It is noted that the toggle mechanism of these embodiments acts similar to the index mechanisms discussed hereinabove and retains the conductive member 54 in one of a plurality of positions corresponding with the plurality of contact surfaces. An indication means is also provided for indicating to the operator which of the discreet positions the conductive member is in. Here, a drum 186 is provided and rotates about a vertical axis. Drum 186 includes gear teeth at its bottom surface similar to those of conductive member 54 shown in FIG. 11. Gear teeth 188 of drum 186 cooperate with shaft 172 in a manner whereby each insertion and retraction of shaft 172 causes a discreet radial movement of drum 186 about its vertical axis. Numerals or other symbols are printed on the exterior surface of drum 186 and are visible to the operator for indicating to the operator the contact surface currently in use. It is noted that in this embodiment conductive member 54 is again loaded from the working end 22 by removal of flush cup 140 and snap ring 154.

Figure 13:
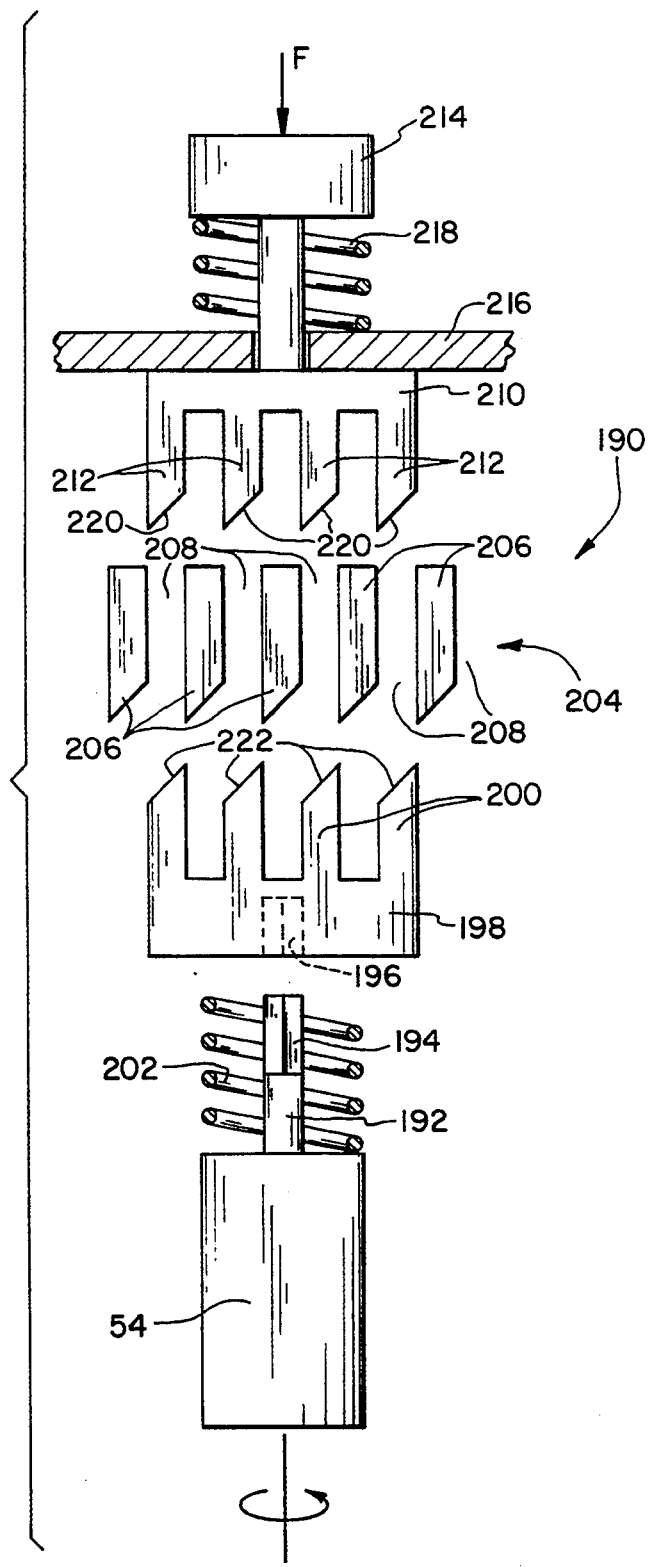
Figure 14:
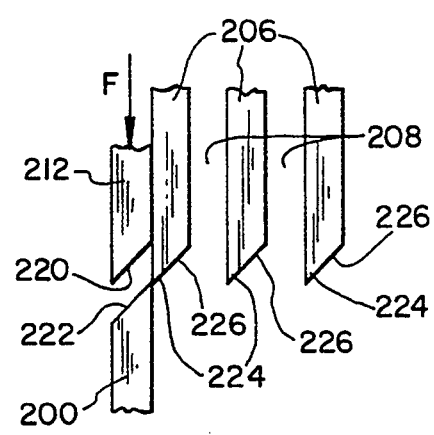
FIG. 14 is a partial diagrammatic view of the mechanism shown in FIG.3.

In the embodiment shown in FIGS. 12—14, the toggle mechanism requires a pushing force which is generally parallel to the longitudinal axis of conductive member 54. Here, the toggle mechanism is generally indicated in FIG. 12 by the numeral 190 and the components thereof are shown diagrammatically in FIGS. 13 and 14. As shown in FIG. 13, the conductive member 54 is provided with a coaxial shaft 192 having a square-shaped portion 194 at its terminus. Square-shaped portion 194 is adapted to be received within square-shaped bore 196 of lower cylindrical tooth member 198. Lower tooth member 198 is shown diagrammatically in a flat plane in FIG. 13, however, it is noted that, in practice, lower tooth member 198 is generally cylindrical-shaped with teeth 200 extending longitudinally upwardly radially around the longitudinal axis. A spring 202 is provided between member 198 and conductive member 54 thereby urging tooth member 198 upwardly and away from conductive member 54.

A rack 204 of teeth 206 is provided above tooth member 198. Rack 204 is also diagrammatically shown in FIG. 13 in a flat plane, however, in practice is cylindrically-shaped and formed on conductive member bore 56 such that teeth 206 extend radially inwardly from the conductive member bore surface and leaving valleys 208 therebetween. Teeth 200 of member 198 are adapted to be slidingly received inbetween rack teeth 206 and within valleys 208.

Above rack 204 there is provided an upper cylindrical tooth member 210 formed with teeth 212. Upper cylindrical tooth member 210 is shaped generally identical to member 198 and is again diagrammatically shown in a flat plane in FIG. 13. Tooth member 210 is, however, provided with a push rod 214 adapted to be forced downwardly in the direction as shown by arrow F. A wall 216 attached to bore 56 and a spring member 218 are provided on push rod 214 as shown and in a manner whereby upper cylindrical tooth member 210 is urged upwardly and away from rack 204.

The components of toggle mechanism 190 are shown blown up in FIG. 13. When they are assembled and brought together, upper tooth member teeth 212 and lower tooth member teeth 200 are both slidingly received within valleys 208 inbetween rack teeth 206. In this fashion, so long as lower tooth member teeth 200 are within valleys 208, conductive member 54 is prevented from turning about its longitudinal axis.

In operation, as shown in FIG. 14, when a force F is applied to rod 214, teeth 212 are forced against spring 218 downwardly and in contact with lower teeth member teeth 200. More specifically, slanted faces 220 of upper tooth member 210 are caused to come in contact with slanted faces 222 of lower tooth member 198. In this fashion, lower tooth member teeth 200 are urged downwardly against the force of spring 202 until face 222 clears the lowermost point 224 of rack teeth 206. Immediately at that point in time, face 222 is caused to slide upwardly along face 226 of rack teeth 206. Thus, lower tooth member 198 is caused to turn about its longitudinal axis and simultaneously move upwardly until teeth 200 enter the next succeeding valley 208. As can be appreciated, the turning of member 198 also causes conductive member 54 to turn about its longitudinal axis and, thereby, expose a new contact surface to the wire 12.

Figure 15:
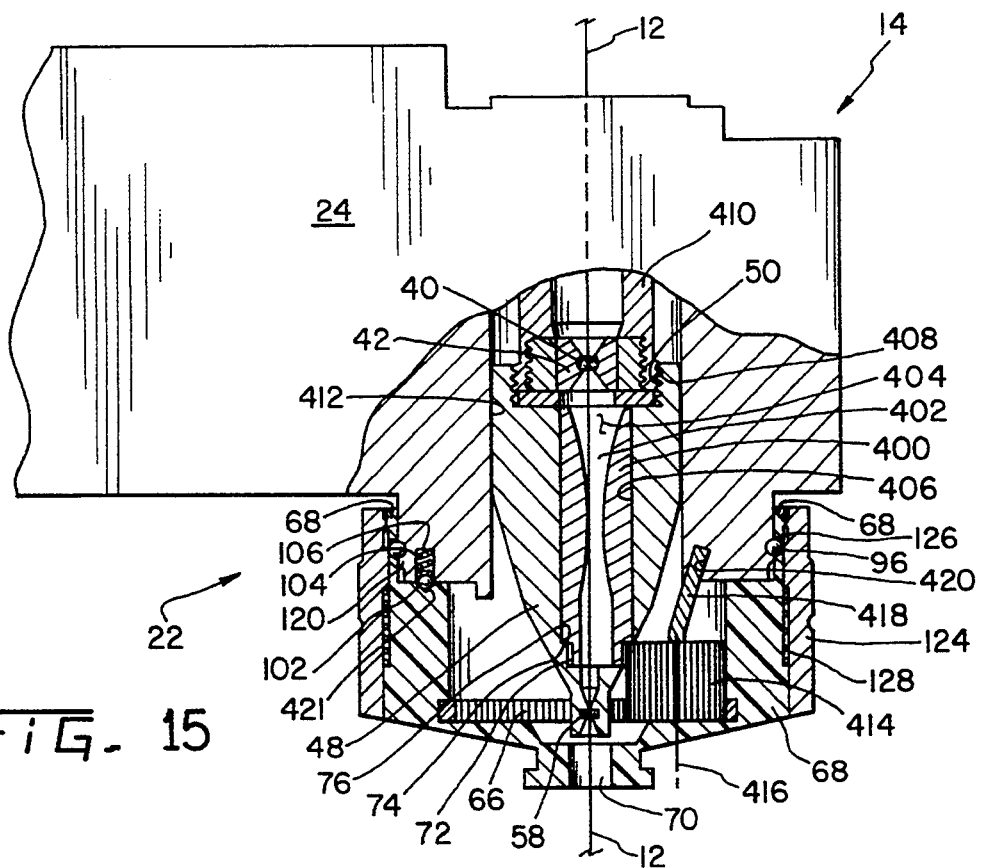
FIG. 15 is a partial cross-sectional view of an apparatus according to the present invention and showing indexing of a traditional bore-type pickup from the working end; and, FIG. 16 is a partial cross-sectional view of an apparatus according to the present invention and showing indexing of a traditional pickup from the working end.
Figure 16:
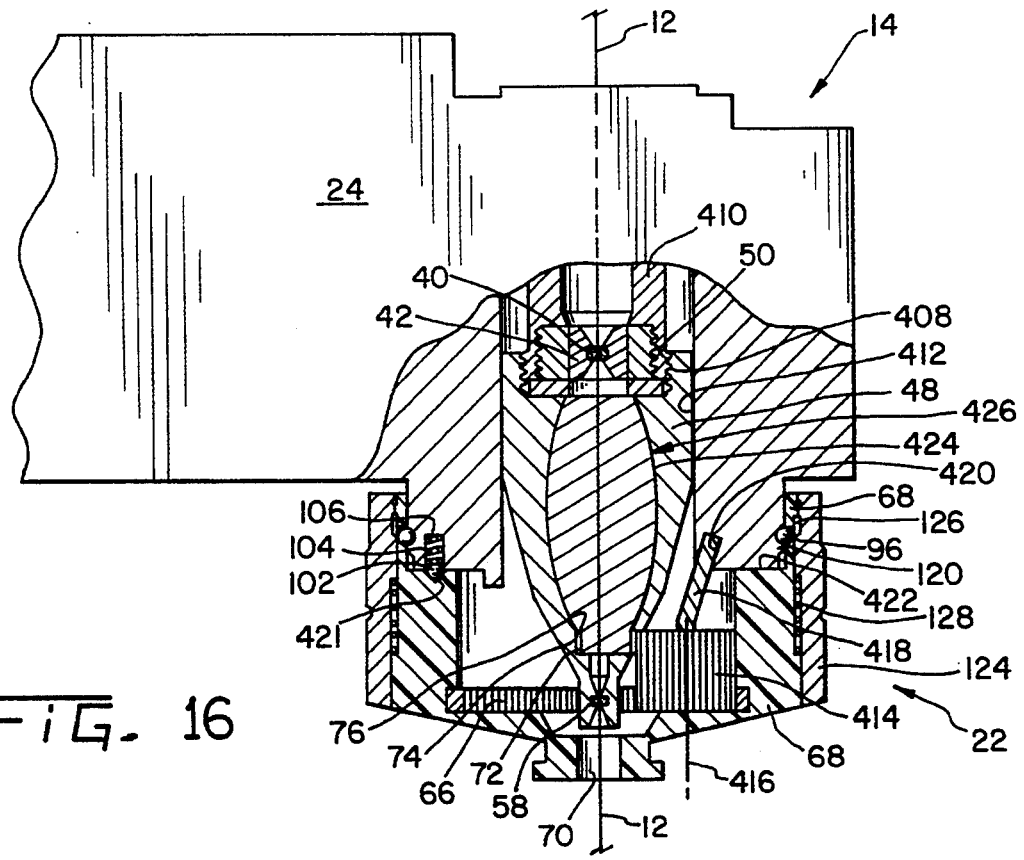

Referring now to FIGS. 15 and 16, there is shown, according to the present invention, an apparatus for adjusting and replacing traditional electrical discharge machine components from the guide assembly working end 22. In FIG. 15, there is shown a traditional bore-type current pickup or member 400 which is electrically conductive and which includes a bore 402 having a bore surface 404 in sliding contact or engagement with wire 12. Gear teeth 72 are formed on or otherwise provided on one end of pickup 400. Pickup 400 is received within a bore 406 in support body or holder 48. At its lower end of pickup 400, an annular flat 74 is provided and is adapted to engage an annular edge 76 formed at the lower end of bore 406. Pickup 400 is received within bore 406 through the upper end of bore 406 and is, thus, adapted to rotate about its longitudinal axis. The longitudinal axis of pickup 400 is offset with respect to the normal straight line of wire travel thereby effectively placing the bore surface 404 in contact with wire 12.

Support member 48 at its upper end thereof also includes a threaded bore 50 for engaging threads 408 of upper assembly component 410. Accordingly, the removal of support body 48 from the guide assembly 14 merely requires turning of support body 48 and, thereafter, withdrawing body 48 through the assembly larger bore 412 from the working end 22.

Gear teeth 72 are provided circumferentially around the lower end of pickup 400 and mesh with or engage intermediate gear 414 which is adapted to rotate about axis 416. Intermediate gear 414 is retained in position via leg 418 which extends upwardly and is frictionally received within bore 420. Thus, leg 418 and intermediate gear 414 are selectively detachable at the working end 22 for the removal and/or replacement of components within guide assembly 14 or within assembly larger bore 412.

Intermediate gear 414 also is engaged with or meshes with ring gear 66 mounted in flush cup 68. As described herein, flush cup 68 also serves as a cover for the various guide assembly components and acts to direct working fluid through opening 70 and onto the workpiece 16. Flush cup 68 is detachably attachable to the working end 22 of guide assembly 14 and is also selectively rotatable about its longitudinal axis which is the normal straight line of wire travel. Accordingly, by turning flush cup 68, intermediate gear 414 turns about its axis of rotation 416 thereby transferring a rotational force through gear teeth 72 to pickup 400 and causing pickup 400 to turn about its longitudinal axis thereby exposing another contact surface within bore 402 to wire 12. It is noted that ring gear 66 can be separately made and affixed within flush cup 68 or, in the alternative, can be injection molded directly into flush cup 68.

Similar to the embodiment shown in FIG. 1, in FIG. 15 the flush cup 68 is selectively removed from the working end 22 by sliding cylindrical member 124 longitudinally downwardly and allowing ball bearings 96 to move radially outwardly within annular groove 126. In this fashion, annular edge 120 is cleared by ball bearings 96 and the cylindrical member 124 and flush cup 68 can be detached. Reattachment merely requires that ball bearings 96 be in annular groove 126 so as to allow the clearing of annular edge 120 and placement of flush cup 68 in the position as shown in FIG. 15.

Similar to the above-discussed embodiments, a detente pin 102 and spring 104 are provided within bore 106. Detente pin 104 is adapted to selectively engage of indentations 421 located on annular surface 422 of flush cup 68. Indentations 421 are spaced appropriately for maximizing the number of contact surfaces which are exposed to wire 12.

In the embodiment shown in FIG. 16, the apparatus is substantially similar to that of FIG. 15 except that the current pickup is yet of a more traditional style wherein the wire 12 travels over the exterior surface and slidingly contacts the wire thereat. More specifically, in the embodiment shown in FIG. 16, a barrel-shaped current pickup 424 is provided having a generally barrel-shaped outer surface 426. Barrel-shaped pickup 424 is offset from the normal straight line of wire travel as needed within support body 48 so as to make proper contact with wire 12. So as to replace pickup 424, support body 48 is made in two sections (not shown) in a manner whereby access to the barrel-shaped bore 428 can be obtained and so that the pickup 424 can be removed and replaced. In all other respects, the embodiment of FIG. 16 is generally the same as that of FIG. 15 and pickup 424 can be adjusted or otherwise indexed via gear teeth 72 for exposing a plurality of contact surfaces of outer surface 426 to wire 12.

As can now be appreciated, the present invention provides a means and a method by which any type of current pickup can be selectively adjusted or turned from the working end 22 of the guide assembly 14 and, additionally, provides a means and a method by which the various components of guide assembly 14 can be removed and/or replaced from the working end 22 of the guide assembly. Indexing of the various current pickups is accomplished as described hereinabove by grasping either the flush cup or a ring member located on the working end 22 of assembly 14 and turning the same thereby causing the necessary motion through the assembly working end 22 and adjusting the pickup for exposing a new or another contact surface to the wire 12. Alternatively, a tool such as hexagonal ball 166 shown in FIG. 6 can be inserted through the cover or flush cup and turned or otherwise moved for causing the necessary motion through the assembly working end 22 and selectively adjusting the current pickup. Depending on the type of tool required and size thereof, it is contemplated that the cover that may be used on the working end 22 for covering at least part of working end 22 and/or the flush cup 68 can be removed or otherwise pushed aside so as to gain access to guide assembly 14 through working end 22 and create the necessary adjustment to the current pickup.

As can now also be appreciated, the present invention provides for an easy means of removing and/or replacing guide assembly components such as the current pickup 54, 400, and 424, guide members 58, support body 48, etc., without having to disassemble the guide assembly 14 and by merely gaining access to these components through the working end 22. As discussed hereinabove, in the preferred embodiments, access to the guide assembly components is gained through the assembly working end 22 by selectively removing the flush cup 68 or 140 and, thereafter, removing and/or replacing one or more components from working end 22. It is contemplated that various other covers can be provided extending at least partially over working end 22 and that such cover members or the flush cup are to be detached or otherwise moved aside for gaining access to the guide assembly components. Depending on the service requirements, after gaining such access through working end 22, a current pickup and/or guide element can be easily removed and replaced with a similar current pickup or guide element.

While the invention has been described as having specific embodiments, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. An electrical discharge machine apparatus including a wire guide assembly for guiding a moving conductive wire in cutting engagement through a workpiece and having a working end closest to the workpiece, said apparatus comprising:
   an electrically-conductive member in sliding engagement with the wire;
   means for adjusting said conductive member to expose a plurality of contact surfaces to the wire; and,
   wherein said adjusting means is accessible from the working end of said guide assembly.

2. The apparatus of claim 1 further comprising a ring gear on said working end of said assembly and wherein said conductive member comprises gear teeth coupled to said ring gear, whereby turning of said ring gear adjusts said conductive member to expose a plurality of contact surfaces.

3. The apparatus of claim 2 wherein said ring gear is mounted on a flush cup having a hole wherethrough the wire passes, said flush cup located on the working end of said guide assembly.

4. The apparatus of claim 2 wherein said ring gear is mounted on a ring member circumscribing the wire, said ring member located on the working end of the guide assembly.

5. The apparatus of claim 2 wherein said conductive member includes a bore, the wire traveling through the bore and in sliding contact with a bore surface.

6. The apparatus of claim 2 wherein said conductive member includes an outer contact surface, the wire traveling over and in sliding contact with said outer contact surface.

7. The apparatus of claim 6 wherein said conductive member outer contact surface is barrel-shaped.

8. The apparatus of claim 1 wherein said conductive member includes a bore, the wire traveling through the bore and in sliding contact with a bore surface.

9. The apparatus of claim 1 wherein said conductive member includes an outer contact surface, the wire traveling over and in sliding contact with said outer contact surface.

10. The apparatus of claim 9 wherein said conductive member outer contact surface is barrel-shaped.

11. In an electrical discharge machine including a wire guide assembly for guiding a moving conductive wire in cutting engagement through a workpiece, the assembly including a current pickup in sliding engagement with the wire and being adjustable for exposing a plurality of contact surfaces to the wire, the assembly further including a working end closest to the workpiece, a process of exposing a plurality of pickup contact surfaces to the wire comprising the step of:
    causing motion of said pickup through said assembly working end and thereby adjusting said pickup for exposing another contact surface to the wire.

12. The process of claim 11 wherein said assembly includes a ring on said assembly working end coupled to and adapted for adjusting said current pickup, and wherein said step of causing motion through said assembly working end comprises grasping and turning said ring.

13. The process of claim 11 wherein said assembly includes a flush cup on said assembly working end coupled to and adapted for adjusting said current pickup, and wherein said step of causing motion through said assembly working end comprises grasping and turning said flush cup.

14. The process of claim 11 wherein prior to the step of causing motion through said assembly working end a cover member extending at least partially over said working end is removed from said assembly.

15. The process of claim 14 wherein said cover member is a flush cup having a hole wherethrough the wire passes.

* * * * *